United States Patent [19]

Stauber

[11] Patent Number: 4,587,130

[45] Date of Patent: May 6, 1986

[54] STORABLE PRODUCT WHICH CAN BE WHIPPED UP TO A DESSERT MOUSSE, AND A PROCESS FOR ITS PREPARATION

[75] Inventor: Niklaus Stauber, Thayngen, Switzerland

[73] Assignee: CPC International Inc., Englewood Cliffs, N.J.

[21] Appl. No.: 558,258

[22] Filed: Dec. 5, 1983

[30] Foreign Application Priority Data

Dec. 10, 1982 [CH] Switzerland ............... 7220/82

[51] Int. Cl.⁴ ............... A23L 1/04; A23G 9/02; A23C 9/154
[52] U.S. Cl. ............... 426/564; 426/565; 426/568; 426/589; 426/572; 426/613
[58] Field of Search ............... 426/565, 564, 568, 572, 426/613, 589

[56] References Cited

U.S. PATENT DOCUMENTS

| | | | |
|---|---|---|---|
| 1,440,011 | 12/1922 | Hosman | 426/565 |
| 1,699,526 | 1/1929 | Fisher | 426/565 |
| 1,935,596 | 11/1933 | Fear | 426/565 |
| 2,131,064 | 9/1938 | Musher | 426/564 |
| 3,535,122 | 10/1970 | Mussellwhite et al. | 426/565 |
| 3,701,669 | 10/1972 | Van Den Hoven | 426/564 |
| 3,806,605 | 4/1974 | Patterson | 426/564 |
| 4,088,792 | 5/1978 | Bracco . | |
| 4,146,652 | 3/1979 | Kahn et al. | 426/565 |
| 4,308,287 | 12/1981 | Kahn et al. . | |
| 4,338,347 | 7/1982 | Trop et al. | 426/572 |
| 4,390,550 | 6/1983 | Kahn et al. . | |
| 4,410,555 | 10/1983 | Richardson | 426/572 |

FOREIGN PATENT DOCUMENTS

| | | |
|---|---|---|
| 0040386 | 11/1981 | European Pat. Off. . |
| 339619 | 7/1921 | Fed. Rep. of Germany . |
| 814388 | 7/1951 | Fed. Rep. of Germany . |
| 1038385 | 9/1958 | Fed. Rep. of Germany . |
| 1297453 | 6/1969 | Fed. Rep. of Germany . |
| 1692663 | 12/1973 | Fed. Rep. of Germany . |
| 2353663 | 5/1975 | Fed. Rep. of Germany . |
| 2445392 | 7/1980 | Fed. Rep. of Germany . |
| 2803634 | 1/1983 | Fed. Rep. of Germany . |
| 1432061 | 2/1966 | France . |
| 1486674 | 5/1967 | France . |
| 338087 | 6/1959 | Switzerland . |
| 371674 | 10/1963 | Switzerland . |
| 381513 | 10/1964 | Switzerland . |
| 395717 | 12/1965 | Switzerland . |
| 401657 | 5/1966 | Switzerland . |
| 430411 | 8/1967 | Switzerland . |
| 443869 | 2/1968 | Switzerland . |
| 465376 | 12/1968 | Switzerland . |
| 499272 | 1/1971 | Switzerland . |
| 1282501 | 7/1972 | United Kingdom . |
| 1291014 | 9/1972 | United Kingdom . |
| 1323380 | 7/1973 | United Kingdom . |
| 1379828 | 1/1975 | United Kingdom . |
| 1398355 | 6/1975 | United Kingdom . |
| 1432364 | 4/1976 | United Kingdom . |
| 2031260 | 4/1980 | United Kingdom . |
| 2061691 | 5/1981 | United Kingdom . |

*Primary Examiner*—Jeanette Hunter

[57] ABSTRACT

A storable, preferably solid base product for preparing a dessert mousse and a process for its preparation. The product contains sugar or another natural or artificial sweetener, 10 to 80 percent by weight of fat, 0.1 to 15 percent by weight of binder, 0.5 to 10 percent by weight of emulsifier, and, optionally, other ingredients. The product can be whipped up to a mousse of excellent texture and outstanding flavor by being suspended in liquid and, when desirable, milk products and other ingredients may be added.

21 Claims, No Drawings

STORABLE PRODUCT WHICH CAN BE WHIPPED UP TO A DESSERT MOUSSE, AND A PROCESS FOR ITS PREPARATION

FIELD OF THE INVENTION

The present invention relates to a storable, preferably solid product which can be whipped up with liquid to a dessert mousse, and a process for its preparation. Such a product may be advantageously employed in the preparation of a superior, home-made tasting dessert mousse.

BACKGROUND OF THE INVENTION

By "mousse", and especially by "dessert mousse", there is usually understood a cold, foamed dessert, which in some cases can also be frozen, but in contrast to a whipped cream, has a certain pudding-like solidity and retains this structure for at least a few hours. Chocolate mousse (Mousse au chocolat), for example, is well-known and quite popular, being a specialty of many homemakers and numerous restaurants. Usually chef or home-made chocolate mousse is prepared a few hours before consumption. The process consists of first suspending slab chocolate or cooking chocolate in water or milk on a waterbath and stirring the suspension until it becomes smooth, adding egg yolks, while stirring continuously, mixing the mass with stiffly whipped egg whites and/or whipped cream and leaving it to cool. This preparation requires quite a bit of time and a great degree of skill so that the whipped mousse does not break down to an unattractive, sticky mass.

In order to make this preparation simpler and risk-free, dried powdered products which have been commercially available for a relatively long time, have been used. These powdered products can be whipped up with cold milk to a dessert mousse in the same way as a powdered product can be used for the preparation of whipped cream. Such instant mousse powders for chocolate mousse generally consist of a mixture of cocoa powder, chocolate powder, sugar, and powdered fat which can be whipped up with flavor extracts, emulsifiers and colorings. These products, which are convenient to handle and generally easy to prepare, are quite popular, especially in the catering industry. However, the sensory quality of the mousse obtainable therefrom is poorer than that of a freshly prepared mousse. The powdered product generally results in a less flavorful, overly aerated mousse which does not have the smooth, creamy consistency of the home-made product. A prepared product with the sensory qualities of a home-made mousse would be a desirable improvement over known powdered products.

SUMMARY OF THE PRESENT INVENTION

It is an object of the present invention to provide a process which can be used to form a product that is whipped up with liquid to a dessert mousse superior to those made from prior art processes.

It is a further object of the present invention to provide a solid product which results in a mousse having a smooth, velvety texture, and a home-made flavor comparable to a mousse which has been prepared by the skilled chef in the classical manner.

It is still a further object of the invention to provide a superior product which rapidly, easily and reliably produces a mousse having the desired structure and sensory qualities of a home-made product.

It is another object of the invention to provide a product which can be practiced on an industrial scale while being storage-stable and having a relatively long shelf-life.

The objects, features and advantages of the present invention will become more apparent in light of the following description thereof.

In accordance with this invention, a process is provided for the preparation of a preferably solid product which can be whipped up to a mousse of excellent texture and outstanding flavor by being suspended in liquid and by adding flavor ingredients, where desirable.

The product of the invention is characterized in that it contains sugar or another natural or artificial sweetener, 10 to 18 percent by weight of fat, 0.1 to 15 percent by weight of binder, 0.5 to 10 percent by weight of emulsifier, these amounts being based on the total weight of the product, and, where desirable, other ingredients.

This product can be in the form of a base product which has a more or less neutral flavor and to which the desired flavor substances can be added when the mousse is prepared. As an alternative, the product may contain all the ingredients and then require only the addition of a liquid to give a suspension which can be whipped up and allowed to cool in order to give the desired mousse dessert.

DETAILED DESCRIPTION OF THE INVENTION

The central feature of the present invention is a process that compares favorably with "chef-made mousse". The process of the invention results in a preferably solid product that is storage-stable and easily packaged, with advantages for manufacturing and consumer use. The product can be easily reconstituted to form a mousse having the flavor and sensory qualities of a typical home-made mousse.

The process according to the preferred embodiment of the invention is characterized in that molten edible fat is processed to a homogeneous mass with sugar or another natural or artificial sweetener, an emulsifier and a binder, and, when desired, other ingredients. The components are combined in amounts of 10 to 80 percent by weight of fat, 0.1 to 15 percent by weight of binder and 0.5 to 10 percent by weight of emulsifier, based on the total weight of the product being used. The molten mass is then formed into the desired shape and allowed to cool.

The product is preferably prepared in solid form using a fat which is solid at room temperature. The molten mass can, for example, be cast into divisible slabs, bars, cubes, balls and the like, or extruded to crumbs and the like, or comminuted to powder. Such product forms can be metered particularly easily. Alternatively, the product can be marketed in a semi-solid, or paste-like state by using fat with a lower melting point.

Another embodiment for processing the product of the invention is characterized in that 10 to 80 percent by weight of edible fat, 0.1 to 15 percent by weight of binder and 0.5 to 10 percent by weight of emulsifier, all based on the total weight of the product, are combined with sugar or other natural or artificial sweeteners, and, where desirable, other additives. The ingredients are then kneaded or milled to a homogeneous mass. As an alternative, the components can be intimately mixed with one another in finely ground form.

All the known edible fats which are solid or, when desirable, semi-solid at room temperature, and have an appropriate or, optionally, virtually no intrinsic flavor, are suitable for the purpose of the present invention. The selection of the fat depends upon the desired flavor of the product, as well as on the prevailing temperatures at the place of use. Examples of preferred fats for use in the invention are cocoa butter, palm oil, peanut oil, coconut oil and mixtures thereof.

The usual types of sugar, such as sucrose, cane sugar, fructose, honey and the like, as well as artificial sweeteners, such as saccharin, cyclamate, aspartame and the like, can be used as the sweetening agent for the process of the invention. If a sweetener other than sugar is used, the amount added depends upon the desired sweetening power.

Suitable binders for the process of the invention are thickeners and gelling agents which are hydrocolloids. Binders which are suitable for foodstuffs of this type are, for example, gelatin, carrageenan, guar bean flour, carob bean flour, alginates, xanthan gum, modified starch and combinations thereof. Other suitable hydrocolloids are described, for example, in "Handbook of Water-Soluble Gums and Resins", by Robert C. Davidson (published in 1980 by McGraw-Hill Book Company).

Emulsifiers which are known to the expert skilled in the art and are commercially available can be chosen for the process of the invention. Suitable examples of emulsifiers are monoglycerides and diglycerides of edible fatty acids, monoglycerides and diglycerides of edible fatty acids esterified with citric acid, diacetyltartaric acid, acetic acid, lactic acid, tartaric acid, or acetic acid and tartaric acid, 1,2-propylene glycol esters of edible fatty acids, sugar-esters (sucrose esterified with edible fatty acids, sugar-glycerides (mixtures of sugar-esters with monoglycerides and diglycerides), and lecithin. These emulsifiers can be used separately or in combination with others. Additional emulsifiers may also be used according to the process of the invention.

Flavoring substances which may also be utilized are particularly suitable for admixing directly to the fat mass, but may, where desirable, be admixed later on to the "neutral" base product. These flavors include, most commonly, cocoa powder, chocolate powder, lyophilized coffee or other coffee concentrates, vanilla powder (natural or synthetic), caramel, biscuits, honey, fruit and nut pastes, pieces or powders, alcoholic beverages, alcoholic essences, spices and the like, and corresponding flavor extracts. In particular, admixing of fruit and nuts in pieces, as well as admixing honey to the mousse product of the invention is an advantage over the prior art since these ingredients could be used only to a limited extent in prior mousse products.

In the preparation of a product for chocolate mousse, a chocolate paste (white or dark) can be used directly as a partial substitute for the fat and the cocoa or chocolate powder. Such chocolate pastes, which are commercially available, generally contain cocoa butter and cocoa paste, as well as sugar and/or milk ingredients. Suitable chocolate pastes have, for example, a fat content of about 35 percent by weight.

In addition to the above-mentioned ingredients, the product according to the invention can contain egg whites, which increase the stability of the foam quality of the mousse, as well as colorings and other additives which are ordinarily used in foodstuffs of this type.

According to the process of the invention, a product for a mousse preferably contains, for example, the following amounts of individual components:

| | |
|---|---|
| Fat | 17 to 55% by weight |
| | preferably 25 to 36% by weight |
| Sugar | 35 to 60% by weight |
| | preferably 40 to 50% by weight |
| Binder | 0.5 to 15% by weight |
| | preferably 1.3 to 3.5% by weight |
| Emulsifier | 0.5 to 10% by weight |
| | preferably 1.5 to 5% by weight |
| Egg whites | 0 to 20% by weight |
| | preferably 1 to 3% by weight |
| Cocoa, dry weight | 0 to 30% by weight |
| | preferably 10 to 20% by weight |
| Milk constituents | 0 to 20% by weight |

The cocoa dry weight here indicates the amount of fat-free cocoa components in the cocoa or chocolate pastes. The milk constituents may be absent from very dark chocolate mousse products. However, the addition of some milk-containing ingredients is of considerable importance in white chocolate mousse products, while the cocoa powder is omitted in white chocolate mousse products.

If a product with a flavor other than a chocolate mousse is desired, the expert can easily substitute for the cocoa or chocolate components of a chocolate mousse, an appropriate amount of any other flavor substances, and, where necessary, can also adapt the remaining amounts of ingredients. However, a fat content of about 17 to 55 percent by weight is most suitable for all products not intended for diabetic purposes.

The ingredients are preferably stirred or mixed together in a heatable mixing device with heat being applied until the desired degree of homogeneity of the mass is achieved.

In most of the examples set forth below, a Moltomat mixing apparatus was used, and the sequence of steps was as follows:

The fat, for example, cocoa butter, was first comminuted and warmed, together with the emulsifier, to the melting temperature of the fat, for example, from 50° to 55° C. for cocoa butter. The mixture was cooled and then mixed intimately with cocoa paste which had been comminuted or liquefied by warming. The temperature of the mixture was maintained at about 32° C. About two-thirds of the amount of chocolate paste to be used was then admixed, followed by addition of the sugar or sweetener. When a uniform mixture had been achieved, first additional flavorings and then the dry binder were incorporated and intimately mixed with the remainder of the mass. The last third of the chocolate paste was then added to this mixture. The cooling of the mixture which occurred at this point was neutralized by heating, so that a temperature of about 32° C. was again reached and was maintained. Finally, the larger additives, such as fruit, nuts and the like, were admixed, and the warm, homogeneous mass was cast or molded into shape and cooled.

To prepare a base mass without flavor components, the fat, emulsifier, sugar, milk constituents and binder are processed together to form a homogeneous mass in the same manner as described above. Instead of the cocoa and chocolate paste, the corresponding flavor substances required for other mousses can be admixed.

All the examples set forth below were carried out however, using the processes mentioned above, in which the flavor components were added to the base mass.

The actual mousse dessert is formed from the solid product of the invention which is then suspended in liquid, for example, water, skimmed milk, a milk-water mixture, fruit juice, tea, coffee and the like. The resulting product can then be mixed with milk and/or cream and is whipped up, preferably at about room temperature, that is, at a temperature from about 20° to 30° C. The product of the invention results in a dessert mousse of outstanding quality, which can be kept for several hours without a change in texture and can be frozen without any deterioration in quality.

One method of suspending the product of the invention in the liquid to form the mousse is by "dissolving" the product in about one-quarter of the total amount of the liquid desired, while continuously stirring. The liquid should be at a temperature of at least 80° C., preferably at about 80° to 95° C. This suspension can then be admixed with the remainder of the liquid in the cold state, resulting in a mixture at a temperature of about 20° to 30° C., which can then be whipped up to the desired mousse.

However, it is also possible to mix the entire amount of liquid with the product in the cold state, followed by warming the mixture slowly, with occasional stirring, until the product is completely suspended in the liquid or "has dissolved", usually at a temperature of about 33° to 35° C. The suspension is then cooled slightly and finally whipped up.

A further possibility for suspending the product comprises heating the coarsely comminuted product with about one quarter of the cold liquid on a waterbath until the components can be combined to form a suspension, which is then mixed with the remaining cold liquid and is whipped up.

In general, the ratio of product to liquid is about 1 to 1.5 parts by weight of product to 2 parts by weight of liquid.

The following examples illustrate the practice of the invention. The products obtained from the examples below are suspended in liquid using methods as set forth above, and optionally, milk and/or cream are added, and vigorously whipped up. The result is a mousse of faultless texture and an outstanding flavor which can hardly be distinguished from that of a freshly prepared home-made product. This mousse can also be frozen without any impairment of its quality.

EXAMPLE 1

Chocolate Mousse Product

The product was prepared from the following components:

| | |
|---|---|
| Chocolate paste | 68.00 percent by weight |
| Cocoa paste | 5.44 percent by weight |
| Vanilla | 0.09 percent by weight |
| Sugar | 18.13 percent by weight |
| Egg White Powder | 1.81 percent by weight |
| Gelatin 200 Bloom | 4.53 percent by weight |
| Guar bean flour | 0.41 percent by weight |
| Emulsifier-Propane-1,2-diol esters of fatty acids (E477)* | 1.59 percent by weight |
| | 100.00 percent by weight |

*Number attributed to emulsifiers by Official Journal of the European Communities The resulting product had a fat content of about 26.5%. To prepare a mousse, 111 g. of the solid mass was comminuted, stirred with 50 ml. of hot water and mixed with 150 ml. of a milk/cream mixture (1:1). The mixture was then whipped to a foam-like consistency with a hand beater for 3 to 4 minutes.

EXAMPLE 2

A product for a chocolate mousse with a fat content of about 21.5% was prepared from the following components:

| | |
|---|---|
| Chocolate paste | 62.32 percent by weight |
| Sugar | 28.75 percent by weight |
| Egg white powder | 1.92 percent by weight |
| Gelatin | 2.88 percent by weight |
| Guar bean flour | 0.29 percent by weight |
| Emulsifier - Acetic acid esters of mono- and di-glycerides of fatty acids (E472a) | 3.84 percent by weight |
| | 100.00 percent by weight |

To prepare a mousse, 104 g. of this product were processed with 50 ml. of water and 150 ml. of a milk/cream mixture (1:1) as in Example 1.

EXAMPLE 3

A product for a white chocolate mousse was prepared from the following components resulting in a product with a fat conent of about 34.5%.

| | |
|---|---|
| Cocoa butter | 14.85 percent by weight |
| Chocolate Paste, white (41% fat) | 60.09 percent by weight |
| Sugar | 17.62 percent by weight |
| Gelatin 200 Bloom | 2.40 percent by weight |
| Emulsifier (E742a) | 3.20 percent by weight |
| Egg white powder | 0.40 percent by weight |
| Guar bean flour | 0.24 percent by weight |
| Whole milk powder | 1.20 percent by weight |
| | 100.00 percent by weight |

An outstanding mousse with a very subtle flavor was prepared by combining 125 g. of this product with 50 ml. of water and 150 ml. of a milk/cream mixture (1:1). The molten mass can be flavored and colored as desired.

EXAMPLE 4

A product for an orange mousse was prepared from the following components:

| | |
|---|---|
| Cocoa butter | 14.33 percent by weight |
| Emulsifier (1:1 mixture of E472a and E477) | 3.49 percent by weight |
| Foodstuff coloring | 0.02 percent by weight |
| Chocolate paste, white | 39.50 percent by weight |
| Sugar | 15.49 percent by weight |
| Egg White powder | 0.40 percent by weight |
| Fruit powder | 2.32 percent by weight |
| Flavorings | 1.86 percent by weight |
| Citric acid | 0.62 percent by weight |
| Instant gelatin | 2.32 percent by weight |
| Guar flour | 0.23 percent by weight |
| Chocolate paste, white | 19.42 percent by weight |
| | 100.00 percent by weight |

An excellent orange mousse was prepared by processing 130 g. of this product with 50 ml. of water and 150 ml. of a milk/cream mixture (1:1) as described above.

Other features, advantages and specific embodiments of this invention will become readily apparent to those exercising ordinary skill in the art after reading the foregoing disclosures. These specific embodiments are within the scope of the claimed subject matter unless otherwise expressly indicated to the contrary. Moreover, while specific embodiments of this invention have been described in considerable detail, variations and modifications of these embodiments can be effected without departing from the spirit and scope of this invention as disclosed and claimed.

What is claimed:

1. A process for the preparation of a solid base product, which is storage-stable at room temperature, used to prepare a dessert mousse consisting of:
   (a) combining, as principal components, from ten to eighty percent (10-80%) by weight of solid or semi-solid edible fat, selected from the group consisting of cocoa butter, palm oil, peanut oil, coconut oil, and mixtures thereof, at a temperature higher than the melting point of said fat, with 0.1 to 15% by weight of binder, selected from the group consisting of gelatin, carrageenan, guar bean flour, carob bean flour, alginates, xanthan gum, modified starch and mixtures thereof, and 0.5 to 10% by weight of emulsifier, based on the total weight of the product, selected from the group consisting of monoglycerides and diglycerides of edible fatty acids, monoglycerides and diglycerides of edible fatty acids esterified with citric acid, diacetyltartaric acid, acetic acid, lactic acid, tartaric acid, 1,2-propylene glycol esters of edible fatty acids, sugar esters, sugar-glycerides, lecithin and mixtures thereof, with flavoring substances and a sweetener;
   (b) mixing the molten mass thus formed into a homogeneous mass and forming said mass into a desired shape; and
   (c) cooling the shaped mass.

2. The process of claim 1 wherein said sweetener is selected from the group consisting of sucrose, cane sugar, fructose, honey, saccharin, and aspartame.

3. The process of claim 1 wherein flavoring and coloring substances selected from the group consisting of cocoa, chocolate powder, chocolate paste, coffee concentrate, vanilla powder, carmel, honey, fruit, nut pieces, pastes, powders, spices, alcoholic beverages, alcoholic essences, corresponding flavor extracts, and mixtures thereof, are added to the component before or after the processing to a homogeneous mass.

4. The process according to claim 1 wherein a chocolate mousse base product is prepared by mixing said homogeneous mass initimately with grated chocolate paste.

5. The process of claim 1 wherein said edible fat is solid, and the principal components are kneaded or milled to a homogeneous mass.

6. The process of claim 5 wherein said components are intimately mixed with one another in finely ground form.

7. A product prepared by the process of claim 1 which can be whipped up with a liquid to a dessert mousse wherein said product contains a sweetener, 10 to 80 percent by weight of fat, 0.1 to 15 percent by weight of binder, and 0.5 to 10 percent by weight of emulsifier, based on the total weight of the product.

8. The product of claim 7 comprising 25 to 36 percent by weight of fat, 1.3 to 3.5 percent by weight of binder, and 1.5 to 5 percent by weight of emulsifier.

9. The product of claim 7 comprising 17 to 55 percent by weight of fat, 35 to 60 percent by weight of sugar, 0.5 to 15 percent by weight of binder, 0.5 to 10 percent by weight of emulsifier, 0 to 20 percent by weight of egg whites, 0 to 30 percent by weight of cocoa (dry weight), and 0 to 20 percent by weight of milk constituents.

10. The product of claim 7 wherein said product contains natural or artificial flavor and coloring substances selected from a group consisting of cocoa powder, chocolate powder, chocolate paste, coffee concentrate, vanilla powder, caramel, honey, fruit, nut pieces, pastes, powders, spices, alcoholic beverages, alcoholic essences, corresponding flavor extracts, and mixtures thereof.

11. The product of claim 7 wherein said product contains egg whites.

12. The product of claim 7 wherein said product contains milk constituents consisting of powdered milk, fresh milk or cream.

13. The product of claim 7 wherein said product contains cocoa butter as edible fat.

14. The product of claim 7 wherein said product is in the form of slabs, cubes, bars, balls, crumbs or powder.

15. The process of claim 1 wherein the product is suspended in liquid, a milk constituent is added, and the mass is whipped up to a dessert mousse product at a temperature of approximately 20° to 30° C.

16. The process of claim 1 wherein the product is suspended in a liquid selected from the group consisting of water, milk, fruit juice, tea, coffee and mixtures thereof.

17. The process of claim 16 wherein the product is suspended in liquid by mixing the product with one-quarter of the total amount of liquid, while continuously stirring, with the liquid at a temperature of about 80° to 95° C., followed by admixing the suspension with the remainder of the liquid in the cold state, resulting in a mixture at about 20° to 30° C. and whipping up said mixture to a mousse.

18. The process of claim 16 wherein the product is suspended in the liquid by mixing the product with the entire amount of liquid in the cold state, followed by slow warming of the mixture, with occasional stirring until the product is completely suspended in the liquid at a temperature of approximately 33° to 35° C., cooling slightly, and whipping up said mixture to a mousse.

19. The process of claim 18 wherein the product is suspended in the liquid by heating the coarsely comminuted product with about one quarter of the cold liquid on a waterbath until the components can be mixed to form a suspension, which is then combined with the remaining cold liquid, and whipping up said mixture to a mousse.

20. The process of claim 10 wherein the ratio of product to liquid is about 1 to 1.5 parts by weight of product to 2 parts by weight of liquid.

21. A base product for a dessert mousse prepared by the steps comprising:
   (a) comminuting an edible fat and warming, together with an emulsifier, to the melting temperature of said fat;
   (b) cooling the mixture and combining the mixture intimately with a cocoa paste which has been comminuted or liquefied by warming, while maintaining the mixture at a temperature of about 32° C.;

(c) admixing two-thirds of the total amount of a chocolate paste to be added to the product;
(d) adding a sweetening agent consisting of a natural sugar or artificial sweetener and combining all the ingredients until a uniform mixture has been achieved;
(e) incorporating a dry binder, and admixing the last third of the chocolate paste to be added to the mixture;
(f) heating the mixture to a temperature of about 32° C.; and
(g) casting or molding the homogeneous mass into shape and cooling.

* * * * *